Sept. 16, 1952    R. J. IMBERT ET AL    2,610,465
AUXILIARY THRUST MEANS FOR JET-PROPELLED AIRCRAFT
Filed Aug. 6, 1946

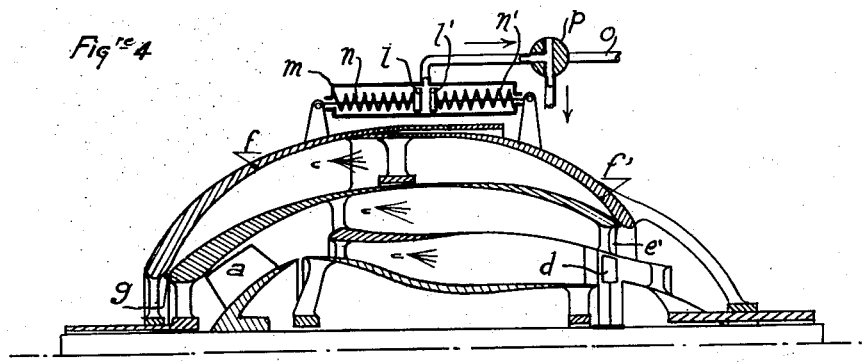
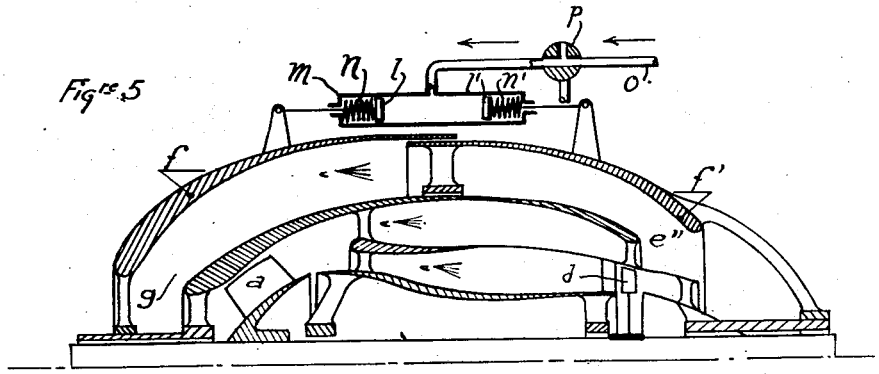

Patented Sept. 16, 1952

2,610,465

UNITED STATES PATENT OFFICE 2,610,465

AUXILIARY THRUST MEANS FOR JET-PROPELLED AIRCRAFT

Roger Jean Imbert and René Anxionnaz, Paris, France, assignors, by direct and mesne assignments, to Societe Rateau (Societe Anonyme), Paris, France, a company of France Application August 6, 1946, Serial No. 688,594
In France September 27, 1945

2 Claims. (Cl. 60—35.6)

It is a known fact that the propulsion of missiles and high speed vehicles in particular of airplanes, may be advantageously ensured by means of reaction jet devices of various kinds inside which the operative air or gases perform one or more thermic cycles comprising in principle the succession of a compression, a heating and an expansion.

Numerous means have been proposed for improving the efficiency of such apparatuses and for reducing the specific consumption of fuel; however, there are certain applications of turbo-jet devices wherein the value of the propelling force or thrust produced predominates at least momentaneously all other considerations including efficiency and consumption of fuel. It is also well known that the thrust obtained depends chiefly on the maximum allowable temperature for the motive cycle.

On the other hand, in some embodiments of turbo-jet devices having a cooling air flow, only a fraction of the operating air passes through the gas turbine and it is not possible to heat to a maximum both gaseous flows except downstream of the gas turbines but before the final expansion inside the reaction jet nozzle. This manner of operating allows, it is true, obtaining a maximum thrust and a high efficiency but at the expense of providing an intricate mechanical arrangement and generally speaking of dealing with an increased weight and cost price of the propeller.

When the case is that of a short operation at maximum speed as for instance for intercepting airplanes or else of missiles, it is of considerable interest to obtain a maximum thrust without the drawbacks relating to weight and cost price as disclosed hereinabove.

Our invention satisfies this condition and has for object chiefly in constantly or temporarily superposing over the cycle of a turbo-jet one or more supplementary cycles including either a mechanical compression of the operating air or else a compression through the recovery of the kinetic energy of the relative wind in a ram-jet or propulsive duct.

The following description and accompanying drawings corresponding thereto and given out by way of examples and by no means in a limitative sense will allow to understand how our invention may be embodied.

Figs. 4 and 5 illustrate the same arrangement as in the preceding figure (Fig. 3) with means for doing away with or reinserting into work the ram-jet.

Figure 1:
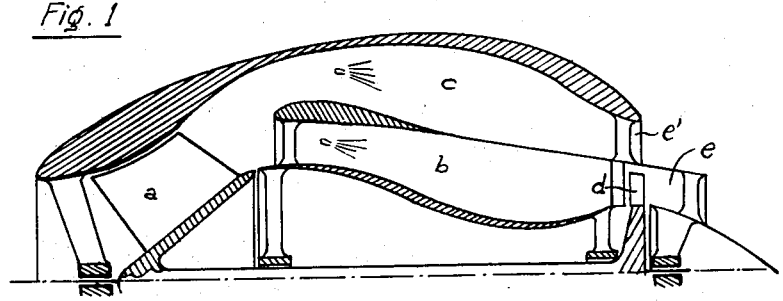
Figs. 1 and 2 illustrate diagrammatically a turbo-jet device with a supplementary cycle including a mechanical compression.

According to our invention, it is possible to associate with a turbo-jet device a first supplementary device operating in accordance with a cycle including a mechanical compression. Fig. 1 illustrates diagrammatically in longitudinal cross-section this arrangement as a whole. The turbo-jet comprises two streams of air the compression of which is ensured through a common compressor $a$ of any type, but the two streams separate after compression while feeding each a separate combustion chamber. Only one flow passes through the gas turbine. In Fig. 1, $a$ illustrates the compressor wheel, $b$ the annular space inside which is heated the flow which feeds the gas turbine $d$ and the reaction jet nozzle $e$ beyond said turbine, while $c$ designates the annular space inside which is heated the second flow which is only a propelling flow, said space $c$ ending with an annular reaction jet nozzle $e'$. In this embodiment, the second flow may be heated to a considerable temperature as it does not act on any movable member, the temperature of the first flow feeding the turbine being limited by the possibilities of the latter as concerns its mechanical behaviour.

Figure 2:
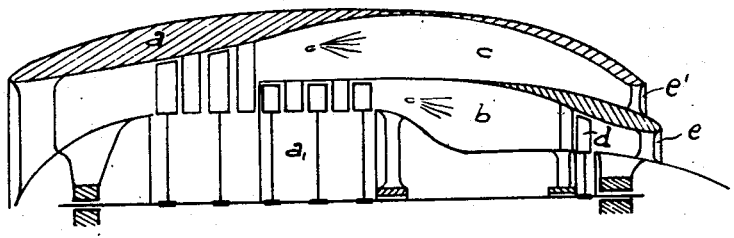

The modification illustrated in Fig. 2, also includes two flows of air intended for combustion, said flows receiving however separately their own mechanical compressions to wit respectively through a fraction $a$ and through the totality $a$—$a_1$ of the stages of the compressor which is driven by the gas turbine $d$. Each flow is provided as precedingly with its own combustion chamber $b$ or $c$ according to the flow considered.

Figure 3:
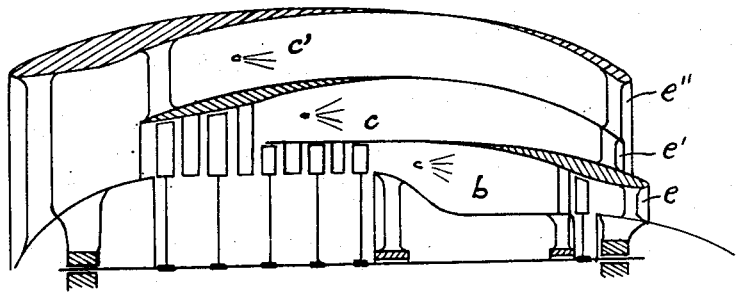
Fig. 3 illustrates a turbo-jet device with two supplementary cycles of which one includes a mechanical compresssion and the other a compression through the recovery of the kinetic energy of the relative wind in a ram-jet.

Lastly, in the modification illustrated in Fig. 3, the arrangement includes the adjunction to the arrangement of Fig. 2 of a cycle providing for compression through the recovery of the kinetic energy of the relative wind, i. e., the adjunction of a ram-jet device, which is arranged outside the two preceding cycles. There are then three heating chambers $b$, $c$, $c'$ corresponding each to one flow and adapted to operate moreover at different temperatures. These three chambers lead into three reaction jet nozzles, coaxial with one another and shown at $e$, $e'$, $e''$. The inlet pipe for the air into the ram-jet is divergent for the speeds for which the relative wind assumes a subsonic velocity and it is convergent-divergent for supersonic velocity.

It is obviously possible to contemplate different combinations; in the case of Fig. 3, the two internal cycles are those of Fig. 2, but they may as well be those of Fig. 1.

It is of interest in the case of slow speeds of progression to render the outer cycles of the ram-jet device inoperative. To this end, and in accordance with a further embodiment of our invention, the outer casing may be made of two parts sliding over one another through their cooperating cylindrical portions. Figs. 4 and 5 show such an arrangement wherein the two halves $f$—$f'$ of the outer casing which have respectively a divergent and a convergent inner shape are mounted in relative sliding relationship so as to allow as desired a closing of the front air intake of the ram-jet at $g$ as well as the closing of the nozzle $e$ at the rear of the ram-jet as shown in Fig. 4 or else for opening both said air intake $g$ and nozzle $e''$ as shown in Fig. 5. Of course the two halves $f$, $f'$ of the outer casing may assume any intermediate position.

The sliding movement of the parts $f$, $f'$ may be controlled by pistons $l$, $l'$ movable in a cylinder $m$ and operated, in a direction of movement, by springs $n$, $n'$ and, in the other direction, by a liquid under pressure issued from pipe $o$ and admitted by a valve $b$. Obviously, all the known arrangement for adjusting the cross-sections of the air intakes or through the nozzles may be applied to the different kinds of reaction jet propellers designed in accordance with our invention.

What we claim is:

1. In an aircraft having for the propulsion in normal flight a main jet device of the kind comprising an air compressor and a power engine for driving the same, both arranged in a casing extending in a fore-and-aft direction and provided with a front aperture for the intake of the atmospheric air and with a jet nozzle rearwardly directed, the provision of an auxiliary ram-jet engine having an annular duct coaxially arranged around the casing of the main jet device, a front annular air intake coaxial with said aperture of said main jet device, a rear annular exhaust nozzle coaxial with the jet nozzle of the main jet device, means to inject fuel into said annular duct, and means for igniting the fuel, said duct with its intake and its exhaust nozzle forming a ram-jet air-and-gas-circuit distinct from the circuit of said main jet device, said annular intake being divergent so as to perform the total compression of the incoming air only by ram effect, means being further combined with said annular intake for throttling at will said intake.

2. In an aircraft having for the propulsion in normal flight a main jet device of the kind comprising an air compressor and a power engine for driving the same, both arranged in a casing extending in a fore-and-aft direction and provided with a front divergent aperture for the intake of the atmospheric air and with a jet nozzle rearwardly directed, the provision of an auxiliary ram-jet engine having an annular duct coaxially arranged around the casing of the main jet device, a front annular air intake co-axial with said aperture of said main jet device, a rear annular exhaust nozzle coaxial with the jet nozzle of the main jet device, means to inject fuel into said annular duct, and means for igniting the fuel, said duct with its intake and its exhaust nozzle forming a ram-jet air-and-gas-circuit distinct from the circuit of said main jet device, said annular intake being divergent so as to perform the total compression of the incoming air only by ram effect, said annular intake forming a part mechanically separate from the remainder of said duct and being mounted so as to slide along the common axis of the main jet device and of said duct for throttling at will, owing to its divergent inner shape, the annular passage between them and the casing of the main jet device.

ROGER JEAN IMBERT.
RENÉ ANXIONNAZ.

REFERENCES CITED

The following references are of record in the file of this patent:

UNITED STATES PATENTS

| Number | Name | Date |
|---|---|---|
| 2,379,541 | Planiol | July 3, 1945 |
| 2,396,911 | Anxionnaz et al. | Mar. 19, 1946 |
| 2,409,177 | Allen et al. | Oct. 15, 1946 |
| 2,464,724 | Sédille | Mar. 15, 1949 |
| 2,503,006 | Stalker | Apr. 4, 1950 |
| 2,509,890 | Stalker | May 30, 1950 |

FOREIGN PATENTS

| Number | Country | Date |
|---|---|---|
| 538,022 | Great Britain | July 17, 1941 |
| 522,163 | France | Mar. 22, 1921 |
| 50,033 | France | Aug. 1, 1939 |
| | (3rd Addition to No. 779,655) | |

OTHER REFERENCES

Ser. No. 367,666, Anxionnaz et al. (A. P. C.), published May 25, 1943. (Corresponds to Anxionnaz et al. 2,396,911.)